US012064062B2

(12) United States Patent
Granger

(10) Patent No.: US 12,064,062 B2
(45) Date of Patent: Aug. 20, 2024

(54) PRE-CUT WIPING MATERIAL DISPENSER, IN THE FORM OF A SPOOL FROM WHICH THE MATERIAL CAN BE UNWOUND IN A STRIP, AND USE OF SUCH A DISPENSER

(71) Applicant: Maurice Granger, Albufeira (PT)

(72) Inventor: Maurice Granger, Albufeira (PT)

( * ) Notice: Subject to any disclaimer, the term of this patent is extended or adjusted under 35 U.S.C. 154(b) by 305 days.

(21) Appl. No.: 17/638,051

(22) PCT Filed: May 28, 2020

(86) PCT No.: PCT/FR2020/050907
§ 371 (c)(1),
(2) Date: Feb. 24, 2022

(87) PCT Pub. No.: WO2021/038141
PCT Pub. Date: Mar. 4, 2021

(65) Prior Publication Data

US 2022/0279989 A1 Sep. 8, 2022

(30) Foreign Application Priority Data

Aug. 29, 2019 (FR) ...................................... 1909506

(51) Int. Cl.
*A47K 10/38* (2006.01)
*A47K 10/36* (2006.01)
(Continued)

(52) U.S. Cl.
CPC .......... *A47K 10/38* (2013.01); *A47K 10/3643* (2013.01); *A47K 2010/365* (2013.01);
(Continued)

(58) Field of Classification Search
CPC ............. Y10T 225/215; Y10T 225/216; Y10T 225/217; Y10T 225/259; Y10T 156/1365;
(Continued)

(56) References Cited

U.S. PATENT DOCUMENTS 3,006,567 A * 10/1961 Collins .................... B65C 11/06 242/909
4,417,495 A * 11/1983 Gordon .................... B26D 7/14 83/37

(Continued)

FOREIGN PATENT DOCUMENTS

FR 2960760 A1 12/2011
FR 2966034 A1 4/2012

(Continued)

OTHER PUBLICATIONS

International Search Report dated Sep. 23, 2020 for corresponding International Application No. PCT/FR2020/050907, May 28, 2020.

(Continued)

*Primary Examiner* — Evan H Macfarlane
(74) *Attorney, Agent, or Firm* — David D. Brush; Westman, Champlin & Koehler, P.A.

(57) ABSTRACT

A wiping material dispenser in the form of a spool from which the material can be unwound in a strip. The dispenser includes a housing and a cutting system for cutting the strip pulled manually by a user. The cutting system includes a flexible blade and at least one tooth mounted on a front side of the housing. The flexible blade includes at least one slot positioned opposite the at least one tooth. The flexible blade can be deformed under the pressure of the strip, when a user pulls on the strip from the front side of the housing, so that the at least one tooth protrudes through the at least one slot, comes into contact with the strip pressed onto the flexible blade and tears the strip at a pre-cut line.

14 Claims, 3 Drawing Sheets

(51) Int. Cl.
*B26F 3/02* (2006.01)
*B65H 35/00* (2006.01)

(52) U.S. Cl.
CPC ......... *A47K 2010/3881* (2013.01); *B26F 3/02* (2013.01); *B65H 35/008* (2013.01)

(58) Field of Classification Search
CPC .............. Y10T 225/282; B65H 35/002; B65H 35/0026; B65H 35/008; B65H 35/0006; B65H 35/04; B65H 35/06; B65H 35/10; G07B 5/02; B26F 3/02; A47K 10/36; A47K 10/38; A47K 10/3643; A47K 2010/365; A47K 2010/3881
USPC ................... 225/19, 20, 21, 57, 77; 156/527
See application file for complete search history.

(56) References Cited

U.S. PATENT DOCUMENTS

| | | | | | |
|---|---|---|---|---|---|
| 5,992,286 | A * | 11/1999 | Boole | B67B 7/30 30/294 |
| 9,265,386 | B2 | 2/2016 | Granger | |
| 9,402,512 | B2 | 8/2016 | Granger | |
| 9,408,505 | B2 | 8/2016 | Granger | |
| 9,526,382 | B2 | 12/2016 | Granger | |
| 10,362,909 | B2 * | 7/2019 | Chang | A47K 10/3637 |
| 2004/0000611 | A1 * | 1/2004 | Boone | A47K 10/36 242/579 |
| 2007/0267455 | A1 * | 11/2007 | Huang | B26D 7/22 156/577 |
| 2013/0075417 | A1 | 3/2013 | Granger | |
| 2013/0256450 | A1 | 10/2013 | Granger | |
| 2014/0008014 | A1 * | 1/2014 | Walker | B65H 35/0026 156/527 |
| 2015/0173572 | A1 | 6/2015 | Granger | |
| 2015/0245745 | A1 | 9/2015 | Granger | |

FOREIGN PATENT DOCUMENTS

| | | | |
|---|---|---|---|
| FR | 2986957 | A1 | 8/2013 |
| FR | 2987253 | A1 | 8/2013 |
| FR | 2992542 | A1 | 1/2014 |
| FR | 2995520 | A1 | 3/2014 |
| WO | 2012168582 | A1 | 12/2012 |

OTHER PUBLICATIONS

Written Opinion of the International Searching Authority dated Sep. 23, 2020 for corresponding International Application No. PCT/FR2020/050907, filed May 28, 2020.
French Search Report and Written Opinion dated Apr. 15, 2020 for corresponding French Application No. 1909506, filed Aug. 29, 2019.
English translation of the Written Opinion of the International Searching Authority dated Nov. 19, 2020 for corresponding International Application No. PCT/FR2020/050907, filed May 28, 2020.

* cited by examiner

PRE-CUT WIPING MATERIAL DISPENSER, IN THE FORM OF A SPOOL FROM WHICH THE MATERIAL CAN BE UNWOUND IN A STRIP, AND USE OF SUCH A DISPENSER

CROSS-REFERENCE TO RELATED APPLICATIONS

This Application is a Section 371 National Stage Application of International Application No. PCT/FR2020/050907, filed May 28, 2020, which is incorporated by reference in its entirety and published as WO 2021/038141 A1 on Mar. 4, 2021, not in English.

TECHNICAL FIELD

The present invention relates to a dispenser of pre-cut wiping material in the form of a spool which can be unwound in a strip, in particular non-woven material.

The invention also relates to the use of such a dispenser.

The field of the invention is that of devices for dispensing wiping material of the type hand towel, paper towel, toilet paper or the like. Conventionally, the material can be paper, cellulose wadding, non-woven fabric, or any other material adapted for the intended application. The material is positioned in the dispenser in the shape of a spool. A strip of material is unwound from the spool, then guided out of the device so that it is accessible to a user.

PRIOR ART

The Applicant has already designed numerous devices, as described for example in documents FR2960760, FR2966034, FR2986957, FR2992542 and FR2995520.

DESCRIPTION OF THE INVENTION

The purpose of the present invention is to improve the existing devices.

In particular, the invention aims at providing a device capable of cutting all types of pre-cut materials, even the most resistant, such as non-woven materials.

To this end, the invention relates to a dispenser of wiping material, in the shape of a spool which can be unwound in a strip, the dispenser comprising a housing and a cutting system of the strip pulled manually by a user, characterised in that the cutting system comprises a flexible blade and at least one tooth mounted on a front side of the housing, in that the flexible blade includes at least one slot positioned opposite the at least one tooth, and in that the flexible blade is deformable under the pressure of the strip, when a user pulls the strip from the front side of the housing, so that the at least one tooth projects through the at least one slot, contacts the strip pressed onto the flexible blade, and tears the strip at a pre-cut line.

Thus, the invention allows to improve the cutting efficiency and reliability of the dispenser, working with all types of pre-cut materials. In particular, the dispenser is well adapted for dispensing non-woven material, requiring significant cutting forces. The dispenser according to the invention has a reduced number of parts, so that it is simple and inexpensive to manufacture.

According to other advantageous features of the invention, taken alone or in combination:

- The flexible blade has at least one end including an oblong hole, receiving a fastening element integral with the housing, the flexible blade thus being able to slide laterally while deforming under the pressure of the strip, subjected to traction when a user pulls on the strip.
- The housing consists of five fixed walls delimiting an interior space for receiving the spool
- Some fixed walls or all fixed walls consist of a flat plate.
- The dispenser comprises a pivoting roll fastened to the housing on the front side, upstream of the cutting system in the strip exit direction, intended to guide the strip from the spool to the flexible blade.
- The roll comprises sections of reduced diameter, and in that the flexible blade comprises tabs disposed protruding in the sections of reduced diameter of the roll.
- The flexible blade includes several slots disposed opposite several teeth.
- The teeth are spaced transversely to the direction of unwinding of the strip.
- The flexible blade includes a single slot disposed opposite one tooth or several teeth.
- Each tooth includes a single protruding tip.
- Each tooth includes several protruding portions.
- The protruding portions are spaced transversely to the direction of unwinding of the strip.

Another object of the invention is the use of a dispenser as described above, equipped with a spool of wiping material which can be unwound in a strip, characterised in that when a user pulls the strip from the front side of the housing, the flexible blade deforms under the pressure of the strip, the at least one tooth projects through the at least one slot, contacts the strip pressed on the flexible blade, and tears the strip at the pre-cut line.

BRIEF DESCRIPTION OF THE DRAWINGS

The invention will be better understood upon reading the description which follows, given only by way of non-limiting example and made with reference to the appended drawings wherein.

DETAILED DESCRIPTION OF THE INVENTION

Figure 1:
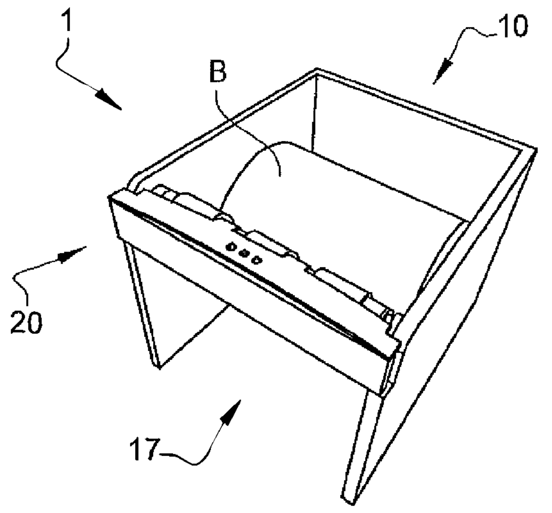
FIG. 1 is a perspective view of a dispenser according to the invention equipped with a spool of wiping material which can be unwound in a strip.
Figure 2:
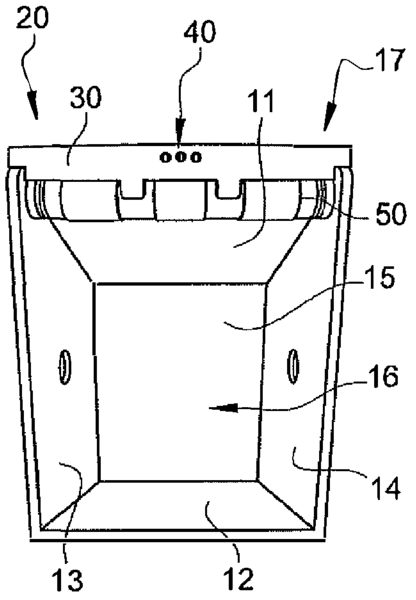
FIG. 2 is a top view of the dispenser of FIG. 1.
Figure 3:
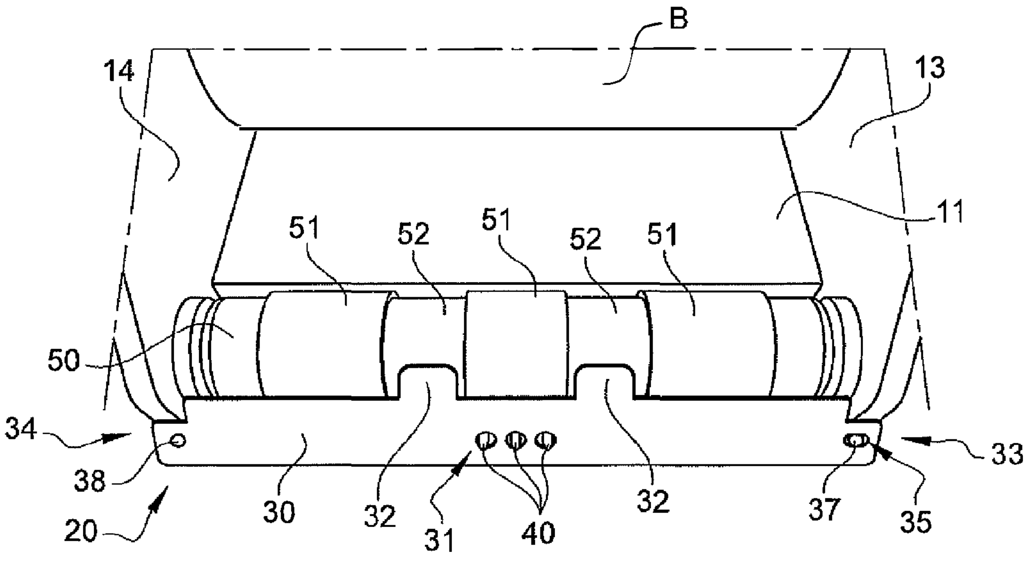
FIG. 3 is a detail view of the front side of the dispenser of FIGS. 1 and 2, showing the material strip cutting system.
Figure 4:
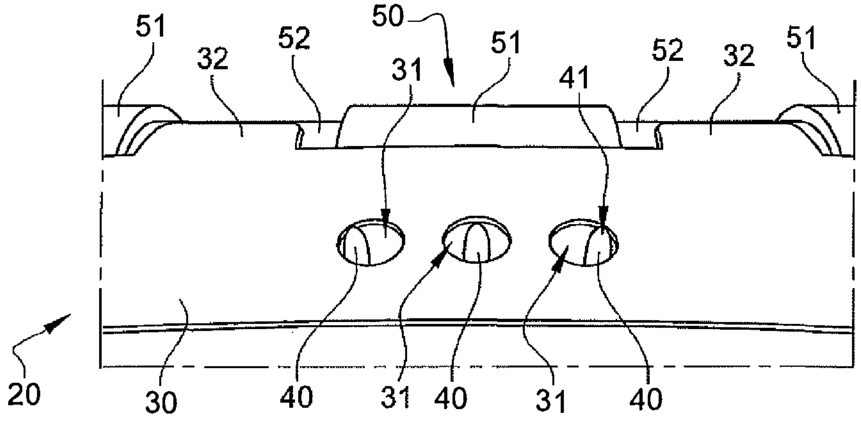
FIG. 4 is another detail view of the cutting system of FIGS. 1 to 3.
Figure 5:
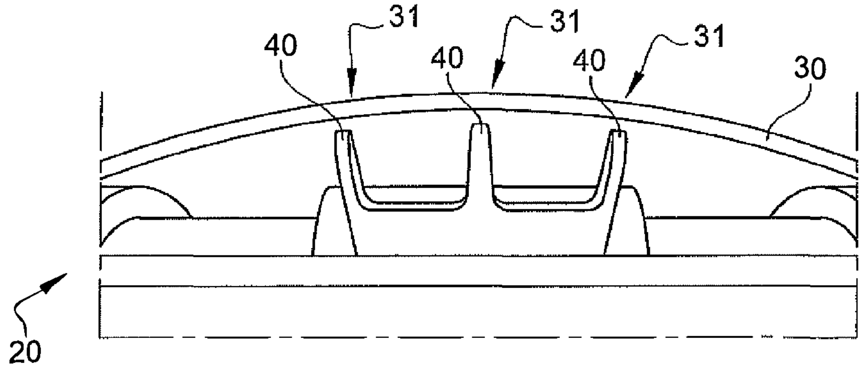
FIG. 5 is another detail view of the cutting system of FIGS. 1 to 4, with the flexible blade in the rest configuration.
Figure 6:
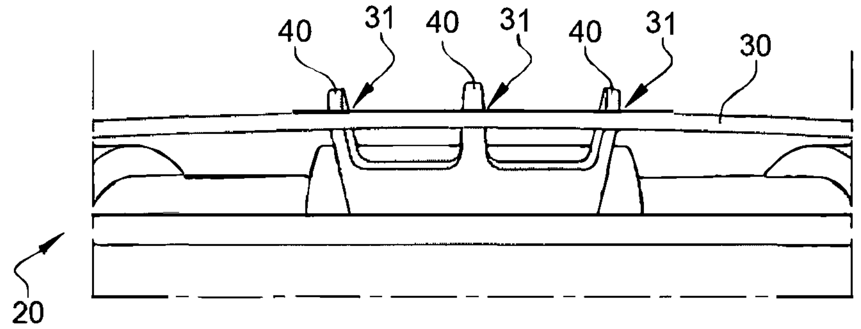
FIG. 6 is a view similar to FIG. 5, with the flexible blade in the active configuration, deformed under the pressure of the strip (not shown).

In FIGS. 1 to 6 is shown a dispenser (1) according to the invention, designed to receive a spool (B) of wiping material which can be unwound in a strip. The wiping material is pre-cut, that is to say the strip includes pre-cut lines. These lines constitute localised weakening areas, making it easier to cut the strip into separate sheets.

The dispenser (1) comprising a housing (10), a cutting system (20), a guide roll (50). The dispenser (1) also comprises a cover, not shown for the purpose of simplification, hinged on the housing (10).

The housing (10) consists of five fixed walls (11, 12, 13, 14, 15) delimiting an interior space (16) for receiving the spool (B). The housing (10) includes a front wall (11), a rear wall (12), two side walls (13, 14) and a bottom wall (15). Advantageously, some or all of the fixed walls (11-15) can be constituted by a flat plate, so as to simplify the construction of the housing (10) and reduce its manufacturing cost. The cover also consists of a flat or slightly domed plate.

The system (20) is adapted to cut the strip pulled manually by a user. The cutting system (20) comprises a flexible blade (30) and three teeth (40) mounted on a front side (17) of the housing (10). Each tooth (40) includes a single protruding tip (41). The flexible blade (30) is mounted to move relative to the housing (10), while the teeth (40) are mounted fixed relative to the housing (10). The flexible blade (30) includes three slots (31) in the shape of circular orifices, positioned opposite the three teeth (40). The teeth (40) are spaced transversely to the direction of unwinding of the strip.

The flexible blade (30) is deformable under the pressure of the tensioned strip, when a user pulls on the strip on the front side (17) of the housing (10). At this time, the tips (41) of the three teeth (40) pass through the slots (31), contact the strip pressed on the flexible blade (30), and tear the strip at a pre-cut line.

The flexible blade (30) extends between two ends (33, 34) mounted on the front wall (11), near the side walls (13, 14). Each end (33, 34) receives a fastening element (37, 38) integral with the housing (10), for example a screw. Advantageously, the end (33) includes an oblong hole (35) receiving the fastening element (37). Thus, the flexible blade (30) can slide laterally relative to the housing (10) at the end (33), while deforming under the pressure of the strip.

The roll (50) is pivotally mounted on the housing (10) on the front side (17), upstream of the cutting system (20) in the strip exit direction. The roll (50) is provided to guide the strip from the spool (B) to the flexible blade (30). The roll (50) comprises sections (51) of large diameter and sections (52) of reduced diameter. The flexible blade (30) comprises tabs (32) disposed protruding in the sections (52). The sections (51) and the tabs (32) housed in the sections (52) force the strip to pass over the blade (30), which allows to prevent paper jams.

Figure 7:
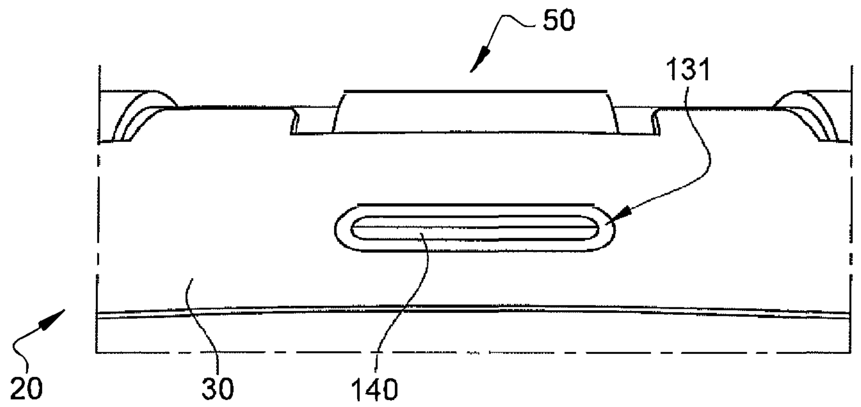
FIG. 7 is a view similar to FIG. 4, for a variant of the cutting system.
Figure 8:
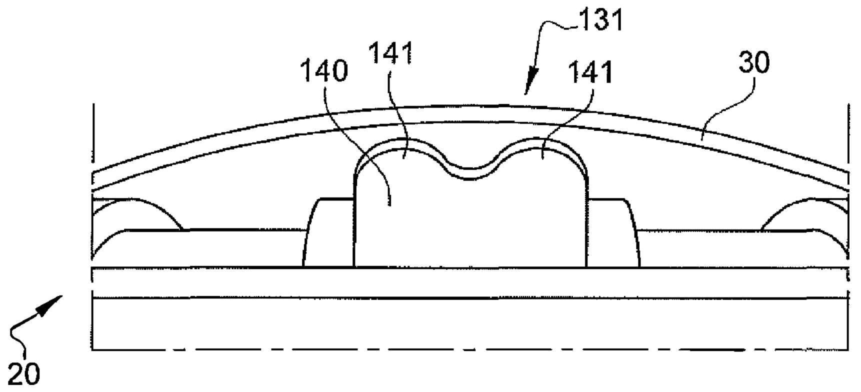
FIG. 8 is another detail view of the cutting system of FIG. 7, with the flexible blade in the rest configuration.
Figure 9:
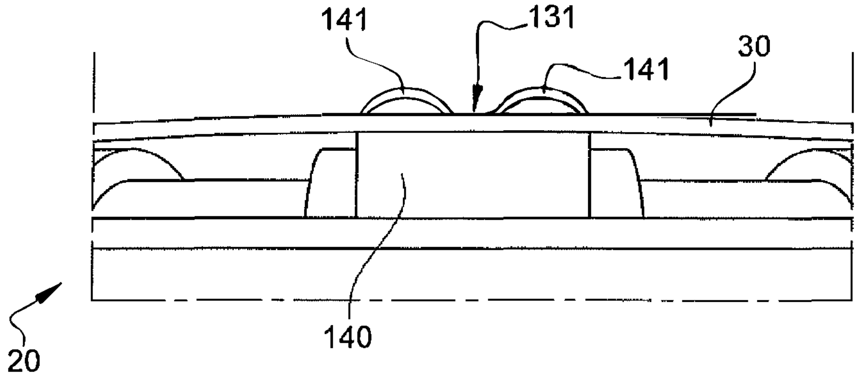
FIG. 9 is another detail view of the cutting system of FIG. 8, with the flexible blade in the active configuration, deformed under the pressure of the strip (not shown).

In FIGS. 6 to 9 is shown a variant of the cutting system (20). The flexible blade (30) includes a single slot (131) disposed opposite a single tooth (140), which includes two protruding portions (141) spaced laterally. The portions (141) are spaced transversely to the direction of unwinding of the strip.

Moreover, the dispenser (1) can be shaped differently from FIGS. 1 to 9 without departing from the scope of the invention, which is defined by the claims. Furthermore, the technical features of the various embodiments and variants mentioned above may be, in whole or for some of them, combined with each other. Thus, the dispenser (1) can be adapted in terms of cost, functionality and performance.

The invention claimed is:

1. A dispenser of wiping material, the wiping material in a spool that is unwindable in a strip, the dispenser comprising:

a housing and a cutting system, the cutting system for cutting of the strip when the strip is pulled manually by a user, wherein:

the cutting system comprises a flexible blade and at least one tooth, the flexible blade and the at least one tooth being mounted on a front side of the housing, the flexible blade includes at least one slot positioned opposite the at least one tooth, the flexible blade is deformable under pressure of the strip, when the user pulls the strip from the front side of the housing, so that the at least one tooth projects through the at least one slot, contacts the strip pressed onto the flexible blade, and tears the strip, and the flexible blade has at least one end including an oblong hole, the oblong hole receiving a fastening element integral with the housing, the flexible blade thus being able to slide laterally while deforming under the pressure of the strip.

2. The dispenser according to claim 1, wherein the at least one tooth includes a single protruding tip.

3. The dispenser according to claim 1, wherein the housing comprises five fixed walls delimiting an interior space for receiving the spool.

4. The dispenser according to claim 1, wherein the dispenser comprises a pivoting roll fastened to the housing on the front side, upstream of the cutting system in a strip exit direction, to guide the strip from the spool to the flexible blade.

5. The dispenser according to claim 1, wherein the at least one tooth includes several protruding portions.

6. The dispenser according to claim 1, wherein the at least one slot includes several slots and the at least one tooth includes several teeth, and wherein the several slots are disposed opposite the several teeth.

7. The dispenser according to claim 1, wherein the at least one tooth includes several teeth, and a single slot of the at least one slot is disposed opposite the several teeth.

8. A dispenser of wiping material, the wiping material in a spool that is unwindable in a strip, the dispenser comprising:

a housing and a cutting system, the cutting system for cutting of the strip when the strip is pulled manually by a user, wherein:

the cutting system comprises a flexible blade and at least one tooth, the flexible blade and the at least one tooth being mounted on a front side of the housing, the flexible blade includes at least one slot positioned opposite the at least one tooth, the flexible blade is deformable under pressure of the strip, when the user pulls the strip from the front side of the housing, so that the at least one tooth projects through the at least one slot, contacts the strip pressed onto the flexible blade, and tears the strip, and a pivoting roll fastened to the housing on the front side, upstream of the cutting system in a strip exit direction, to guide the strip from the spool to the flexible blade, wherein the roll comprises sections of reduced diameter, and the flexible blade comprises tabs disposed protruding in the sections of reduced diameter of the roll.

9. The dispenser according to claim 8, wherein the at least one tooth includes a single protruding tip.

10. The dispenser according to claim 8, wherein the at least one tooth includes several protruding portions.

11. The dispenser according to claim 8, wherein the housing comprises five fixed walls delimiting an interior space for receiving the spool.

12. The dispenser according to claim 8, wherein the at least one slot includes several slots and the at least one tooth includes several teeth, and wherein the several slots are disposed opposite the several teeth.

13. The dispenser according to claim 8, wherein the at least one tooth includes several teeth, and a single slot of the at least one slot is disposed opposite the several teeth.

14. A method comprising:

using a dispenser of wiping material, the wiping material in a spool that is unwindable in a strip, the dispenser comprising:

a housing containing the wiping material and a cutting system of the strip, wherein:

the cutting system comprises a flexible blade and at least one tooth, the flexible blade and the at least one tooth being mounted on a front side of the housing, the flexible blade includes at least one slot positioned opposite the at least one tooth, the flexible blade has an end including an oblong hole, the oblong hole receiving a fastening element integral with the housing, pulling the strip from the front side of the housing, so as to deform the flexible blade under pressure of the strip thereby causing the end of the flexible blade to slide laterally relative to the fastening element, the at least one tooth projecting through the at least one slot, contacting the strip pressed onto the flexible blade, and tearing the strip.

* * * * *